United States Patent [19]
Hoffman

[11] 3,926,280
[45] Dec. 16, 1975

[54] AIRLINE LUBRICATOR
[75] Inventor: Robert K. Hoffman, Plainwell, Mich.
[73] Assignee: Parker-Hannifin Corporation, Cleveland, Ohio
[22] Filed: June 21, 1974
[21] Appl. No.: 481,497

[52] U.S. Cl.............................................. 184/55 A
[51] Int. Cl.²............................................ F16N 7/34
[58] Field of Search..... 184/55 A, 6.26, 55 R, 56 R, 184/56 A, 57, 58, 59, 64, 50 R, 50 A; 239/338, 423, 600, DIG. 4; 73/213; 138/44

[56] References Cited
UNITED STATES PATENTS

| | | | |
|---|---|---|---|
| 2,709,577 | 5/1955 | Pohndorf et al. | 239/338 X |
| 2,718,934 | 9/1955 | Norgren et al. | 184/55 A |
| 2,747,688 | 5/1956 | Faust | 184/55 A |
| 2,890,765 | 6/1959 | Friedell | 184/55 A |
| 3,115,949 | 12/1963 | Malec | 184/55 A |
| 3,115,950 | 12/1963 | Malec | 184/55 A |
| 3,206,175 | 9/1965 | Boteler | 184/55 A X |
| 3,244,257 | 4/1966 | German et al. | 184/55 A |

Primary Examiner—Richard J. Apley
Assistant Examiner—Arnold W. Kramer
Attorney, Agent, or Firm—John N. Wolfram

[57] ABSTRACT

An airline lubricator having a nozzle assembly for atomizing oil and mixing it with air. The nozzle assembly is simple to manufacture, assemble and service and the parts are interfitted and held in assembled position by an elastomeric O-ring that acts as a spring as well as a seal and is supported by conical surfaces to more effectively compensate for tolerance variation. In a recirculating form of the lubricator the atomized oil is recirculated through the oil supply bowl. A curved deflector, a tapered exit passage from the bowl, and a skirt about the lower end of the exit passage aid in reclassifying the larger droplets of atomized oil so that a large portion of the atomized oil leaving the lubricator will be in the form of very small liquid droplets. Also, the mixed air and atomized oil are introduced into the main flow passage closely adjacent the outlet of the latter.

14 Claims, 7 Drawing Figures

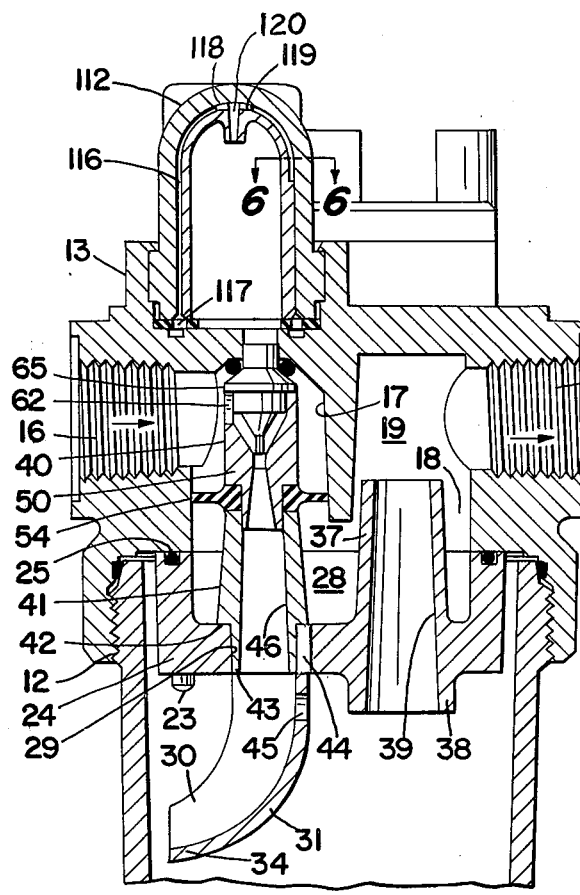
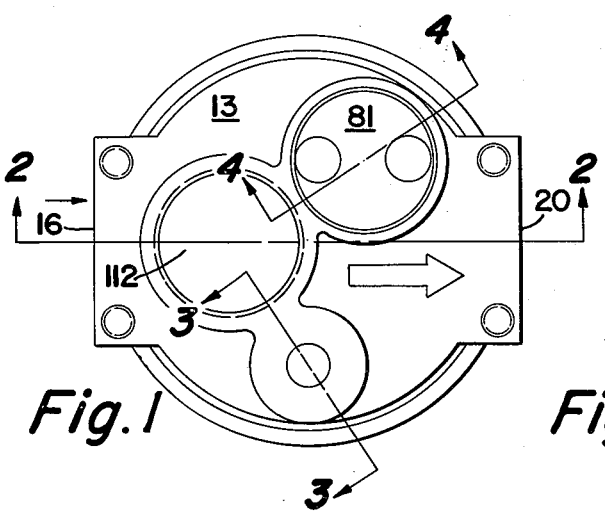
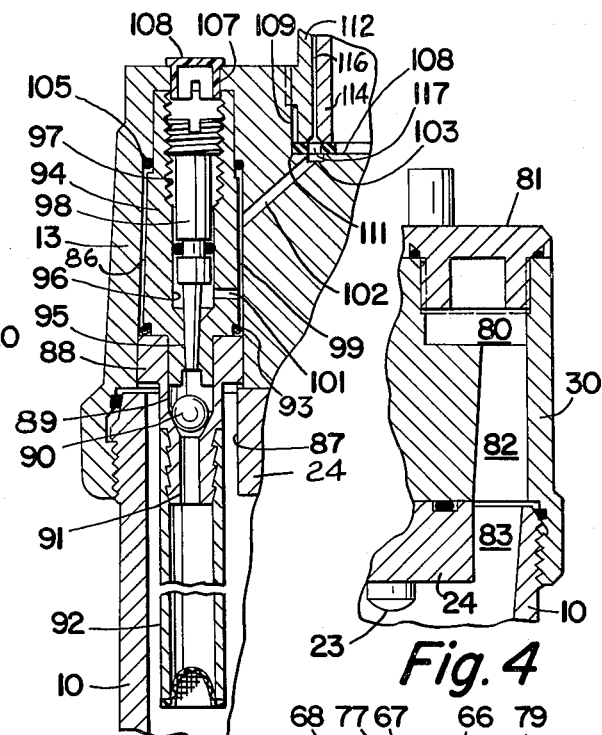
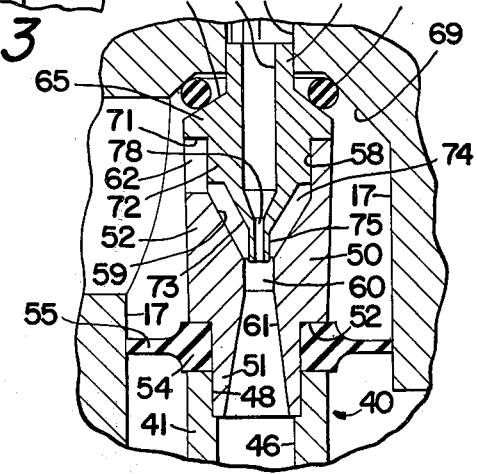
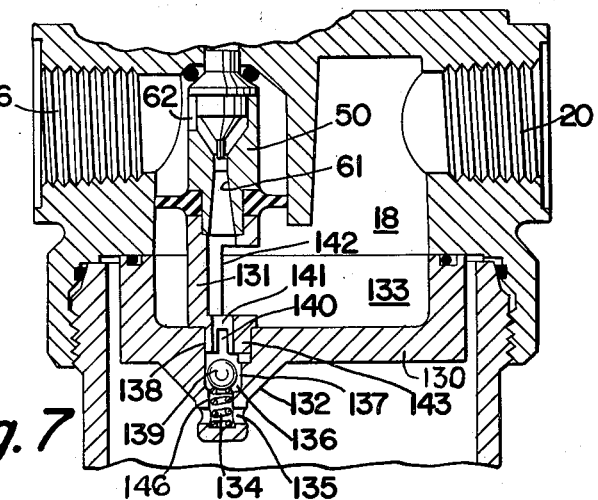

AIRLINE LUBRICATOR

BACKGROUND OF THE INVENTION

In airline lubricators it is desirable to provide a construction that will perform in a highly efficient manner for dividing liquid oil into minute liquid particles and mixing the same with air, and to prevent large size oil particles from being delivered through the lubricator outlet.

In the past, lubricator structures for accomplishing these objectives have been complicated and expensive to produce and to service. The present invention accomplishes these and other objects with a structure that is simple to manufacture and assemble and which may be readily serviced for replacing any worn parts.

SUMMARY OF THE INVENTION

The present invention has for its main objects the provision of an airline lubricator that is simple to manufacture, assemble and service and yet is highly efficient for atomizing oil into fine liquid particles and in separating out the unwanted larger oil particles for reclassification in the oil supply bowl.

To accomplish ease of manufacture, assembly and service, the nozzle assembly is formed of four parts that stack together with telescoped cylindrical sections and which are held in this assembled condition and in a fixed position within the lubricator housing by an elastomeric ring that serves as both a spring for accomplishing this function and as a seal. The elastomeric ring is compressed between tapered surfaces so that the ring will be subject to less axial compression resulting from dimensional variations of the stacked parts than if the ring were between flat surfaces.

To aid in reclassifying the unwanted larger particles of atomized oil, a recirculating type of lubricator assembly is provided in which all oil atomized by the nozzle assembly is returned to the oil supply bowl. A curved deflector, a tapered exit passage from the bowl, and a skirt about the lower end of the exit passage all assist in separating the larger oil particles and causing them to drip into the main body of oil while permitting the finely atomized oil to leave the bowl for introduction into the main air stream and discharge from the lubricator assembly. In addition, the mixed air and atomized oil leaves the bowl through a passage that forms the main passage for air closely adjacent the outlet part for the latter whereby reclassification of the fine particles of oil is minimized.

DETAIL DESCRIPTION

FIG. 1 is a top view of the lubricator.

FIG. 2 is a vertical cross section view of a recirculating type lubricator taken along the lines 2—2 of FIG. 1.

FIG. 3 is a fragmentary section view along the lines 3—3 of FIG. 1.

FIG. 4 is a fragmentary section view along the lines 4—4 of FIG. 1.

FIG. 5 is an enlarged fragmentary section view of the atomizing nozzle assembly.

FIG. 6 is a fragmentary section view through lines 6—6 of the sight dome.

FIG. 7 is a fragmentary section view of a non-recirculating form of the lubricator.

The recirculating type lubricator shown in FIG. 2 includes a bowl 10 having therein a supply of oil 11 and which is threadably connected at 12 with a body 13.

The body has a main air passage therethrough comprising an inlet 16, a vertical bore 17 that connects with a horizontal chamber 18 which is intersected by a vertical chamber 19 that communicates with an outlet port 20.

Attached to body 13 by screws 23 is a base 24 which is sealed against body 13 by an annular packing ring 25, and which with body 13 forms a housing. Base 24 has a recess 28 in register with chamber 18 and it also has an opening 29 therethrough and a deflector 31 of semicircular cross section that provides a channel 30 that curves from an axially extending direction at its upper end 33 to a radially extending direction at its lower end 34. Base 24 also has an upwardly projecting tubular portion 37 that extends into chamber 19 to a position closely adjacent outlet port 20. Base 24 also has a depending skirt 38 and there is a tapered passage 39 extending through skirt 38 and tubular portion 37, the smaller diameter of the passage 39 being at the upper end and the larger diameter at the lower end.

Mounted between body 13 and base 24 is a nozzle assembly 40. It comprises an outlet member 41 having a cylindrical portion 43 at its lower end that has a snug slide fit within bore 29 and a transverse shoulder 42 that abuts the lower wall of chamber 28. Member 41 has a downwardly tapered bore 46 and at the upper end of the outlet member there is a cylindrical counterbore 48. A venturi member 50 has a cylindrical portion 51 at its lower end, part of which slidably receives an elastomeric restrictor disc 54 and the other part of which is received with a snug sliding fit within counterbore 48. Restrictor disc 54 is clamped between a shoulder 52 on member 50 and the upper end of member 41 and it has an annular thin portion 55 that normally sealingly engages the wall of bore 17.

Venturi member 50 at its upper end has a cylindrical bore 58 followed by a conical bore 59 that connects with a venturi throat 60 which in turn communicates with a tapered opening 61. Venturi member 50 has a radial slot 62 at its upper end.

An inlet member 65 has an upper cylindrical portion 66 that has a snug slide fit within body bore 67, a conical portion 68 of substantially the same taper as conical upper portion 69 of bore 17, a transverse shoulder 71 that engages the upper end of member 50, a cylindrical portion 72 that has a snug slide fit within bore 58, a conical section 73 that is substantially parallel to and spaced from conical wall 59 of member 50 to form a conical chamber 74 therebetween, and a cylindrical portion 75 at its lower end that is slightly smaller in diameter than throat 60 and which projects slightly thereinto. A passageway through inlet member 65 includes an upper bore 77 and a restricted bore 78.

Compressed between conical portion 68 and conical wall 69 is an elastomeric ring 79 which serves as a seal and as a spring to keep the parts of the injector assembly 40 assembled to each other in an axial direction and outlet member shoulder 42 tightly engaged with base 24. Because of the axially directed spring-like pressure exerted by O-ring 79 upon the components of the nozzle assembly, and also because of the slide fits of the telescoped portions of these parts, the parts are held in a position corresponding to the minimum stacked height of the assembled nozzle parts with all parts being properly located in an axial direction. Also, O-ring 79 is of larger diameter than cylindrical portion 66 of inlet member 65 and is engaged by conical surfaces 68 and 69 whereby the width of the space between these surfaces in a direction normal thereto changes less than would be the case if these surfaces were normal to the axis of the nozzle assembly. As a result, O-ring 79 undergoes less variation in axial compression with axial dimensional variations of the nozzle parts and also may contract radially to further alleviate excess axial compression.

As shown in FIG. 4, body 13 has a further opening 80 normally closed by a threaded cap 81 and communicating with another opening 82 that registers with an opening 83 for communicating with the interior of bowl 10.

As shown in FIG. 3, body member 13 has another bore 86 registering with a channel 87 on the periferal surface of the base 24 in which is mounted a connector 88 having a bore 89 connected by a valve seat 90 with a lower bore 91 that communicates with a pick-up tube 92 within bowl 10. Seated against connector 88 is a metering block 94 having a tapered metering passage 95 therein that connects to a bore 96 that leads to a threaded opening 97 in which a needle valve 98 is threadably mounted. The outer diameter of metering block 94 is a loose fit within bore 86 so as to provide an annular passage 99 therebetween. A transverse port 101 connects bore 96 with annular passage 99 and the latter is connected by a drill hole 102 with an annular groove 103 in body 13. An O-ring 105 seals metering block 94 at the upper end of bore 86 and body 13 has an access opening 107 closed by a removable plug 108 to permit access to needle valve 98 for adjusting the same against its seat 95. Bore 86 is sealed by an O-ring 93.

Groove 103 is in bottom wall 108 of a recess 109 in body 13. An annular elastomeric washer 111 spans groove 103 and is clamped against wall 108 by an outer sight dome 112 of transparent plastic material threaded into bore 109.

An inner sight dome 114, also of transparent plastic material, is located within outer dome 112 and has several axially extending ribs 115 projecting radially therefrom to space the outer diameter of inner dome 114 from the inner diameter of dome 112 so as to form a generally annular chamber 116 therebetween. A series of holes 117 through washer 111 connect groove 103 with annular chamber 116.

The upper end of inner dome 114 is closed except for a small opening 118 that is connected to annular chamber 116 by a slot 119 across a boss 120 in the upper end of dome 114. Boss 120 is engaged by the upper end of outer dome 112 for pressing inner dome 114 into sealing engagement at its lower end with washer 111.

In the modification of FIG. 7, base plate 24 of FIG. 2 is replaced by a different base plat 130 and injector tube 41 is replaced by outlet member 131. Plate 130 has a depending boss 132 having a bore 146 therein that receives a spring 134 and connects with a cross bore 135 leading to the interior of bowl 10. At the upper end of bore 146 is a valve seat 136, a bore 137 receiving a check valve ball 139 and connecting with a counterbore 138. The upper end of outlet member 131 is formed the same as the upper end of outlet member 41 and the lower end of outlet member 131 has a cylindrical portion 143 snugly fitted within bore 138 and having a transverse slot 140 communicating with a bore 141. The intermediate portion of outlet member 131 is cut away as at 142 so that tapered opening 61 of injector cone 50 communicates directly with chamber 18 in body 13 and recess 133 of plate 130.

In both the recirculating type and the non-recirculating designs the nozzle assembly components are easy to manufacture, assemble and service. Thus nozzle parts 41, 50 and 65 are readily moldable from thermosetting plastic, and with elastomeric restrictor member 54 are readily assembled to each other and clamped between body 13 and base 24 with O-ring 79 providing an automatic takeup to compensate for dimensional variations. Likewise, the parts may be readily separated for disassembly of the parts for servicing, such as for replacement of elastomeric member 54.

OPERATION

In the recirculating form of the invention shown in FIG. 2, a supply of liquid oil is maintained within bowl 10, the latter being conveniently filled through openings 80, 82 and 83. When air under pressure is admitted into inlet port 16, some of the air passes through slot 62 into conical chamber 74 from where it passes through venturi throat 60 and passage 61 into passage 46 and into bowl 10. Another portion of the air passes from inlet port 16 into bore 17 and deflects the thin portion 55 of elastomeric washer 54 away from the wall of bore 17 and passes into chambers 18 and recess 28. Deflection of thin portion 55 increases with increased air flow in a manner to assure a linear oil delivery curve.

Air entering bowl 10 through passage 46, as well as through passage 39 pressurizes the oil within bowl 10. At the same time, air passing through throat 60 creates a lower pressure at 78 which is reflected in pickup tube 92 via bore 77, dome 114, and passages 118, 116, 102, 99, 101, 95 and 91. This causes oil to move upward in pick-up tube 92 past check valve 90 and needle valve 98 which has an open setting relative to needle valve seat 95, and through passage 101, chamber 99, passage 102, groove 103, openings 117, chamber 116 and passage 119 into passage 118 from which it drips into the interior of inner dome 114. From the latter the oil feeds through bores 67, 77, and 78 into venturi throat 60 where it is finely atomized by air passing through throat 60.

The atomized oil in throat 60 is then carried by the air through passages 61 and 46 to channel 30 in deflector 31. The now finely divided particles of oil will be carried by the air from venturi throat 60 through passage 46 and the open sides of channel 30 and also through passage 45 into bowl 10 from which it will pass through passages 39 and 19 where it will be diluted with additional air that has passed through bore 17 into chamber 18 and recess 28 and be carried by the latter to outlet port 20. As the atomized oil enters channel 30 of deflector 31, many liquid particles that are larger in size will travel straight downward and impinge upon the curved wall of deflector 31 and be carried to the radial extremity 34 from which these larger liquid particles will either drip off the extremity 34 into the body of liquid 11 or be caused to impinge against the closely adjacent side wall of bowl 10 from which they will likewise drip down into the main body of oil 11. Meanwhile, any larger particles of oil that may cling to tapered wall 46 will drip off the lower portion of the latter and be carried along the lower surface of base 24 but will be prevented from being swept up through passage 39 by depending skirt 38. Any atomized oil passing through passage 39 into chamber 19 that tends to cling to the wall of chamber 19 and form larger droplets will drip down into recess 28 and be drained back into the bowl through slot 44.

With the arrangement of FIG. 2, a large percentage of the oil passing through venturi throat 60 is broken up into a particle size of from ½ to 3 microns and approximately 3% by weight of the finely atomized oil will be discharged through passages 39 and 19 and through outlet port 20.

The operation of the non-recirculating type of lubricator shown in FIG. 7 is similar to that of the circulating type of FIG. 2 except that substantially all of the oil atomized in venturi throat 60 will be directed to outlet port 20 without re-entering bowl 10. While the lubricator is in operation, check valve ball 139 remains off its seat 136 a slight amount to permit a small amount of the air passing through recess 133 to enter bowl 10 for pressurizing the latter to force oil up tube 92 and also to drain any reclassified oil that may be in recess 133 back into bowl 10.

I claim:

1. An airline lubricator comprising a bowl containing liquid lubricant, a housing attached to the bowl and having an inlet for air, an outlet for a mixture of air and atomized lubricant, and a main passage that directly connects the inlet to the outlet separately of the bowl, an atomizer nozzle assebmly in said passage with internal means for atomizing a portion of the lubricant and for mixing it with a portion of said air, said nozzle assembly being radially spaced from the wall of said passage to form an annular chamber therebetween that constitutes a portion of said passage, means for delivering lubricant from the bowl and air from the inlet to the interior of the nozzle assembly, means for delivering mixed air and atomized lubricant from said nozzle assembly to said outlet, said housing having first and second spaced opposed walls, said nozzle assembly being mounted between said opposed walls and having a first abutment face at one axial end of the nozzle assembly engaging said first wall and a second abutment face at the other axial end of the nozzle assembly spaced from said second wall, and a yieldable member compressed between said second abutment face and said second wall and clamping the nozzle assembly against said first wall to fix the axial position of the nozzle assembly within said housing.

2. The lubricator of claim 1 in which said yieldable member is an elastomeric packing ring that also seals said passage portion from the means for delivering lubricant to the nozzle assembly, and said means for delivering mixed air and lubricant is separate of said passage portion and is via said bowl.

3. The lubricator of claim 1 in which said nozzle assembly carries an elastomeric disk clamped between radially extending surfaces of said nozzle assembly that surrounds the nozzle assembly and normally extends radially across and closes said passage portion against flow of air therethrough but is bendable by pressure of air in said passage portion upstream of said disk to open said passage portion.

4. The lubricator of claim 1 in which said nozzle assembly comprises an outlet member seated against said first wall, a venturi member having a portion thereof slip fitted within the outlet member, and an inlet member having a portion thereof slip fitted within said venturi member, and said yieldable member acting on said inlet member to maintain said other members in said slip fitted relationships.

5. The lubricator of claim 4 in which said venturi and outlet members have opposed abutment faces and there is an elastomeric annular valve disk clamped between said last mentioned abutment faces and extending across said passage portion to normally close the same, said disk being bendable by pressure of air in said passage portion upstream of the disk for opening said passage portion, and said inlet member, venturi member, disk and outlet member being maintained in their axial relation to each other solely by axial pressure exerted by said yieldable member.

6. The lubricator of claim 4 in which said housing has first and second members detachably connected to each other and respectively providing said first and second walls, said nozzle assembly being accessible for removal from said passage portion when said housing members are detached from each other, and said inlet member has an axially extending portion slip fitted into a bore in said first housing member and said outlet member has an axially extending portion slip fitted into a bore in said second housing member for fixing the radial position of said nozzle assembly in said passage portion.

7. The lubricator of claim 1 in which said nozzle assembly has a transverse passage through which mixed air and atomized lubricant is discharged directly into said main passage.

8. The lubricator of claim 1 in which said second face is conical, said second wall has an annular portion substantially normal to the longitudinal axis of the nozzle assembly and has a conical portion surrounding the annular portion, and said yieldable member is an elastomeric packing ring that surrounds a cylindrical portion of said nozzle assembly and has a radial clearance therewith, said packing ring having a diameter greater than the diameter of said annular portion, said packing ring being clamped between said conical portions and out of contact with said annular portion.

9. An airline lubricator comprising a bowl containing liquid lubricant, a housing attached to the bowl and having an inlet for air and an outlet for mixed air and atomized lubricant, and a main passage that connects the inlet directly to the outlet separately of the bowl, an atomizer nozzle assembly in said passage with internal means for atomizing a portion of the lubricant and for mixing it with a portion of said air, means for delivering a portion of said air and a portion of said lubricant to the interior of said nozzle assembly, and means for discharging said mixed air and atomized lubricant to the interior of said bowl, and additional means forming another passage in said housing connecting the interior of the bowl with said main passage, said additional means including a tubular portion projecting from a wall of the housing into said main passage and radially spaced from the wall of said main passage to form an annular chamber therebetween that constitutes a portion of said main passage.

10. The lubricator of claim 9 in which said another passage is straight but tapered throughout substantially its entire length from a larger diameter leading from the interior of the bowl to a smaller diameter leading to said main passage for resisting flow of large droplets of oil therethrough from the bowl to said main passage.

11. The lubricator of claim 9 in which said additional means includes a tubular skirt portion projecting from an exterior surface of the housing toward said bowl interior.

12. An airline lubricator comprising a bowl containing liquid lubricant, a housing attached to the bowl and having an inlet for air, an outlet for mixed air and atomized lubricant, and a main passage that directly connects the inlet to the outlet separately of the bowl, an atomizer nozzle assembly in said passage with internal means for atomizing a portion of the lubricant and for mixing it with a portion of said air, means for delivering a portion of said air and a portion of said lubricant to the interior of said nozzle assembly, means for discharging said mixed air and atomized lubricant to the interior of said bowl, and additional means on one radial side of the bowl forming another passage in said housing connecting the interior of the bowl with said main passage, a deflector extending from the housing into said bowl on a radial side of the bowl opposite said one radial side, said deflector having a radially extending end portion remote from the housing and directed away from said one radial side, said deflector having a single curved channel portion between the housing and said end portion in axial alignment with said discharging means and against which said mixed air and atomized lubricant is discharged from said nozzle assembly.

13. The lubricator of claim 12 in which said deflector has a side opening through said channel portion closely adjacent said housing of substantially less cross section area than said channel portion and out of axial alignment with said discharging means, said side opening permitting circulation of air and atomized oil therethrough.

14. The lubricator of claim 12 in which there is a drain passage through the housing downstream of the nozzle assembly connecting the main passage directly with the interior of the bowl.

* * * * *